Aug. 23, 1932. J. F. O'CONNOR 1,873,718
FRICTION SHOCK ABSORBING MECHANISM
Filed Feb. 25, 1929
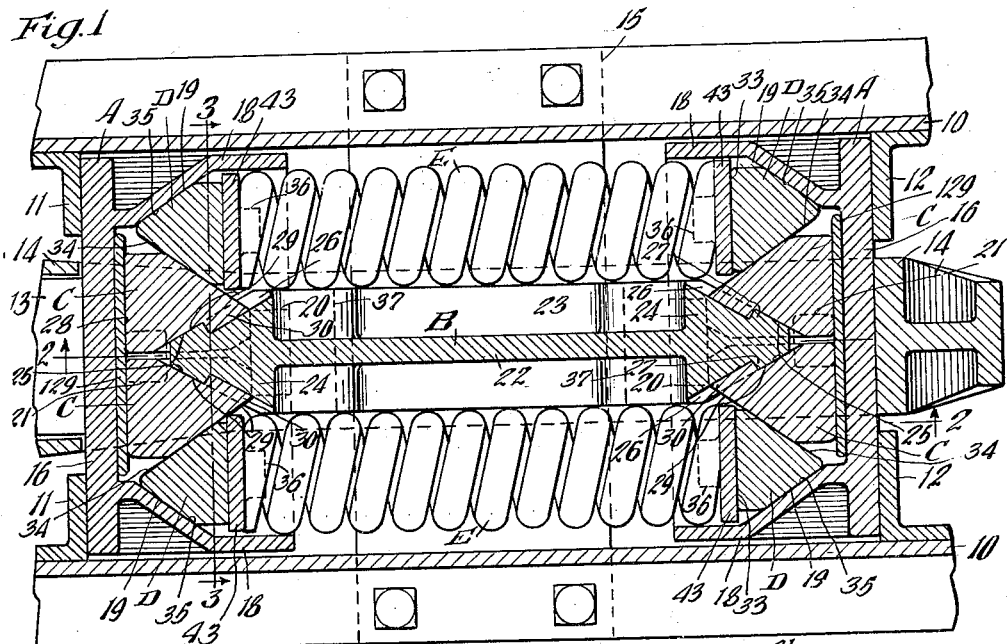
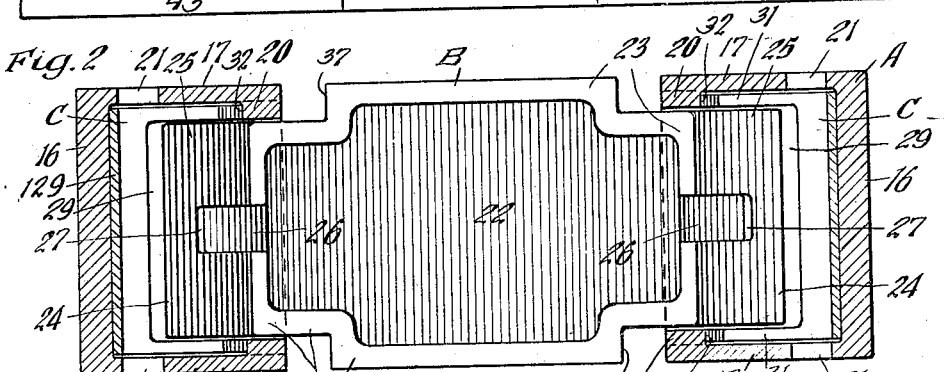
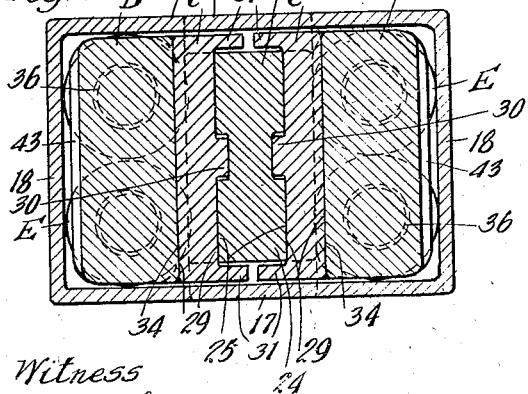
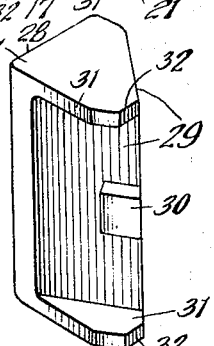
Inventor
John F. O'Connor
By Joseph Harris
His Atty.
Witness
Wm. Giger Patented Aug. 23, 1932

1,873,718

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed February 25, 1929. Serial No. 342,425.

This invention relates to improvements in friction shock absorbing mechanisms.

One object of the invention is to provide a friction shock absorbing mechanism especially adapted for railway draft riggings, including end followers and a plurality of spring resisted friction wedge elements interposed between the followers and adapted to be actuated upon relative approach of the same, wherein certain of the friction wedge elements and the followers have interlocking means to limit separation of the followers and maintain the mechanism assembled.

A more specific object of the invention is to provide a friction shock absorbing mechanism including end followers and a plurality of spring resisted friction wedge members interposed therebetween, including a longitudinally disposed central column having wedge faces at opposite ends thereof, friction wedge blocks cooperating with the wedge faces of the column and having frictional engagement with the followers, and additional wedge blocks having wedging engagement with the friction wedge blocks and followers, wherein the friction wedge blocks have shouldered engagement with the followers and column to limit separation of the followers and hold the mechanism assembled.

Other and further objects of the invention will more clearly appear from the description and claims hereinafter following.

In the drawing forming a part of this specification, Figure 1 is a horizontal, longitudinal sectional view of a portion of the underframe structure of a railway car at one end of the same, illustrating my improvements in connection therewith. Figure 2 is a longitudinal, vertical, sectional view, corresponding substantially to the line 2—2 of Figure 1, illustrating the shock absorbing mechanism only. Figure 3 is a vertical, transverse, sectional view, corresponding substantially to the line 3—3 of Figure 1. And Figure 4 is a detailed perspective view of a friction wedge element employed in connection with my improved shock absorbing mechanism.

In said drawing, 10—10 indicate spaced, channel-shaped center or draft sills of a railway car underframe, to the inner sides of which are secured front stop lugs 11—11 and rear stop lugs 12—12. The inner end of the coupler shank is designated by 13 and has a hooded yoke 14 operatively connected thereto. My improved shock absorbing mechanism is disposed within the yoke and the yoke in turn is supported by a detachable saddle plate 15 secured to the draft sills.

My improved friction shock absorbing mechanism comprises, broadly, a pair of outer followers A—A, a central wedge column B, two pairs of friction wedge blocks C—C, two pairs of wedge blocks D—D, and a pair of spring resistance elements E—E.

The outer followers A are of similar design, each being in the form of a casing having a relatively heavy transverse end wall 16, spaced top and bottom walls 17—17, and spaced side walls 18—18. The end wall 16 of each follower cooperates with the corresponding stop lugs of the draft sills. As shown, the side walls 18 are provided with inwardly diverging portions presenting opposed interior wedge surfaces or faces 19—19. The top and bottom walls of each follower are provided with interior transversely disposed retaining ribs 20—20 at the inner ends thereof. As shown in Figure 1, the ribs 20 are relatively short, thereby leaving openings at opposite sides to accommodate the friction wedge blocks C. Each follower casing A also has central openings 21—21 in the top and bottom walls thereof adjacent the transverse end walls. These openings are to permit the insertion of a tool used in removing the friction wedge blocks.

The wedge column member B is of a form illustrated in Figure 2 and comprises a central, vertically disposed, relatively heavy web 22 reinforced by top, bottom and end flanges 23. At the opposite ends, the column B is provided with enlargements 24—24 having outwardly converging wedge faces 25—25 on opposite sides thereof. As shown in Figures 1 and 3, each wedge face 25 is centrally slotted at the rear portion thereof, as indicated at 26, thereby providing a retaining shoulder 27 for a purpose hereinafter pointed out.

The friction wedge blocks C, which are four in number, are arranged in pairs at opposite ends of the mechanism, the members of each pair being disposed at opposite sides of the column member B. The friction wedge blocks are of similar design, each having a flat outer end face 28 cooperating with a wear plate 129 interposed between the same and the end wall 16 of the corresponding casing A. At the inner end, each block C is provided with a pair of inwardly converging wedge faces 29—29. The wedge face 29 on the inner side of the block is keener than the face 29 on the outer side and cooperates with the wedge face 25 at the corresponding side of the wedge column B. Each block C is also provided with a retaining lug 30 on the inner face thereof, which engages within the slot 26 at the corresponding side of the column B and is adapted to engage the shoulder 27, thereby limiting outward movement of the block C with respect to the column. Each block is also provided with top and bottom flanges 31—31 extending laterally inwardly and overhanging the wedge face 29. The flanges 31 are provided with flat end faces 32 which are adapted to engage the ribs 20 of the casing A, thereby limiting outward movement of the casings with respect to the block C. As will be evident, the blocks C being limited in their outward movement by shouldered engagement with the column and the follower casings in turn being limited against outward movement with respect to the blocks C by having shouldered engagement therewith, the separation of the follower casings is positively limited, thereby maintaining the over-all length of the mechanism and holding the parts assembled.

The wedge blocks D, which are four in number, are also arranged in pairs at opposite sides of the mechanism and are interposed between the blocks C and the wedge faces of the casings A. Each block D has a flat inner end face bearing directly on a spring follower plate 33. At the front end, each block D is provided with a pair of wedge faces 34—35 which diverge inwardly of the mechanism. The wedge face 34 is on the inner side of the block and cooperates with the outer wedge face 29 of the corresponding block C. The wedge face 35 of each block D cooperates with the wedge face 19 of the corresponding casing A, the wedge face 19 being similarly inclined to the wedge face 35.

The spring resistance elements E, which are disposed at opposite sides of the column B, are interposed between the spring followers 43 at opposite ends of the mechanism. Each spring element E preferably comprises a pair of relatively heavy coils arranged lengthwise of the mechanism and disposed in vertical alignment. As shown in Figure 1, the spring followers 43 are of greater width than the wedge blocks D, whereby relative movement in a lateral direction of the blocks on the spring followers is permitted. In order to maintain the springs in alignment with the spring followers 43, the latter are preferably provided with central, inwardly projecting lugs 36—36 engaging within the ends of the coils of the springs.

The operation of my improved shock absorbing mechanism is as follows: During either a draft or buffing stroke of the mechanism, the follower casings A will be moved inwardly relatively to each other, thereby forcing the blocks C inwardly therewith along the column B. Due to the wedging engagement between the blocks C and the column, the blocks will be forced laterally apart sliding on the wear plates 129 and thus squeezing out the blocks D between the wedge faces of the blocks C and the wedge faces of the casing, compressing the spring resistance elements E. During this action, in addition to the friction created between the outer ends of the blocks C and the wear plates 129, friction will also be created between the cooperating wedge faces of the blocks D, casings A and the blocks C, due to slippage of these faces on each other, and friction will also be had between the inner ends of the blocks D and the spring followers 33, inasmuch as the blocks D are forced to slide laterally outwardly while being forced inwardly of the mechanism.

Compression of the mechanism will be limited by engagement of the end walls of the followers with the opposite ends of the column B and also by engagement of the inner ends of the top and bottom walls of the followers with vertical stop shoulders 37—37 provided at opposite ends of the column, the stop shoulders 37 and inner ends of the followers being spaced apart, in the normal full release position of the mechanism, a distance equal to the spacing between the outer ends of the column and the wear plates 129 on the inner sides of the end walls of the casings A.

During the compression of the mechanism, the abutment faces 32 on the blocks C will be moved laterally of the ribs 20 and the abutment shoulders on said blocks will be moved inwardly away from the abutment shoulders on the opposite ends of the column B. The lateral movement of the blocks C, however, is not so great as to disengage the abutment faces 32 from the ribs 20. When the actuating force is reduced, the expansive action of the spring resistance elements E will force the wedge blocks D outwardly, carrying the casings A therewith. Due to the wedging action of the blocks D, the blocks C will be held in contact with the wedge faces of the column and be forced laterally inwardly toward each other as the casings are separated. Inasmuch as the ribs 20 of the follower casings are at all times in engagement with the abutment faces 32 of the blocks C, the latter will be carried outwardly with the casings until the lugs 30 of the blocks C engage the shoulders 27 of the column, whereupon outward movement of the blocks C and the follower casings A will be positively limited.

In assembling the mechanism, the blocks C are first inserted in the casings A by disposing the same on opposite sides of the ribs 20 and then sliding the same laterally inwardly toward each other, engaging the abutment faces 32 on the ends of the flanges 31 in back of the ribs. The remainder of the mechanism, comprising the column B, the friction wedge blocks D, the spring followers 43 and springs E, are then assembled and the two followers, with the wedge blocks C therein, are telescoped over these parts.

During the assembling operation, the converging wedge members at the opposite end of the column B will enter between the wedge faces of the pairs of blocks C. Considerable pressure is then applied to force the followers A toward each other, thereby wedging the blocks C apart until the lugs 30 of the latter snap over the shoulders 27 of the column, whereupon all of the parts will be interlocked so as to limit the separation of the followers A, thus holding the parts assembled.

To disassemble the mechanism, the blocks C are forced apart by a wedge member which is inserted through the opening 21 of the follower A. As will be evident when the members C are forced apart, the lugs 30 will be disengaged from the shoulders 27 of the central column and the abutment faces 32 on the flanges of the blocks C will be disengaged from the ribs 20, whereupon the parts of the mechanism will be automatically separated and forced apart by the springs E. As will be obvious, all of these parts may then readily be removed.

From the preceding description taken in connection with the drawing, it will be evident that I have provided rugged retaining means for holding the parts of the mechanism assembled, which does not in any way weaken the structure of any of the parts and especially the walls of the front and rear follower casings. Further, by providing the retaining means described, the parts may be quickly assembled or separated when desired.

While I have herein shown and described what I consider the preferred manner of carrying out my invention, the same is merely illustrative and I contemplate all changes and modifications which come within the scope of the claims appended hereto.

I claim:

1. In a friction shock absorbing mechanism, the combination with outer followers relatively movable toward and away from each other, said followers having wedge means thereon; of a plurality of cooperating friction wedge elements at each end of the mechanism; additional friction wedge elements cooperating with the first named wedge elements and having wedging engagement with the wedge means of the followers; spring resistance means between said followers opposing relative movement of the friction wedge elements; means for restricting longitudinal separation of certain of said elements at opposite ends of the mechanism; and cooperating means integral with each follower and others of said cooperating wedge friction elements respectively, having shouldered engagement, for limiting separation of each follower and the corresponding last-named elements, thereby also limiting longitudinal separation of said followers and holding the mechanism assembled.

2. In a friction shock absorbing mechanism, the combination with outer followers relatively movable toward and away from each other; of a column element interposed between said followers; wedge elements at opposite ends of the mechanism having wedging engagement with the column; additional wedge elements at opposite ends of the mechanism, having wedging engagement with the first named wedge elements and said followers; spring resistance interposed between the last named wedge elements; and means on said first named wedge elements having shouldered engagement with the column and followers for limiting separation of the followers and holding the mechanism assembled.

3. In a friction shock absorbing mechanism, the combination with outer followers relatively movable toward and away from each other; of a central column interposed between said followers; friction wedge blocks at each end of the column, each of said means including a wedge block having wedging engagement with said column, each block also having shouldered engagement with the column to limit outward movement of the block, each block further having shouldered engagement with the corresponding follower to limit outward movement thereof and hold the mechanism assembled; and spring means between said followers opposing movement of the friction wedge means at opposite ends of the mechanism.

4. In a friction shock absorbing mechanism, the combination with outer followers relatively movable toward and away from each other; of a longitudinally disposed column interposed between said followers, said column having wedge faces at opposite ends thereof; a pair of wedge blocks at each end of the column, the blocks of each pair being disposed on opposite sides of the column and having frictional engagement with said followers and wedging engagement with the wedge faces of the column, said blocks having shouldered engagement with the column and followers to limit outward movement of the followers and hold the mechanism assembled; a pair of additional wedge blocks at each end of the mechanism having wedging engagement with the friction wedge blocks and cooperating follower; and spring resistance means interposed between the wedge blocks at opposite ends of the mechanism.

5. In a friction shock absorbing mechanism, the combination with front and rear follower casings having opposed interior wedge faces; of two pairs of wedge blocks at opposite ends of the mechanism, the blocks of each pair being disposed at opposite sides of the mechanism and engaging the wedge faces of the corresponding follower casing; spring resistance means at opposite sides of the mechanism interposed between the pairs of wedge blocks; a column member interposed between the followers, said column member having retaining shoulders and wedge means at opposite ends thereof; a pair of friction wedge blocks at each end of the mechanism disposed on opposite sides of the column, having shouldered engagement with means on the top and bottom walls of the follower casings to limit outward movement of the casings, having frictional engagement with the corresponding followers and having wedging engagement with said column and the first named wedge blocks, said friction wedge blocks having retaining shoulders cooperating with the retaining shoulders of the column to limit outward movement of the blocks.

6. In a friction shock absorbing mechanism, the combination with front and rear followers relatively movable toward and away from each other, said followers having wedge means thereon; of a plurality of cooperating friction wedge elements at each end of the mechanism; spring resistance means; additional wedge members at opposite ends of said spring resistance means, said additional wedge members having wedging engagement with said wedge elements and wedge means on said followers; cooperating interengageable means integral with said followers and said wedge elements respectively for limiting separation of each of the followers and cooperating wedge elements in a direction lengthwise of the mechanism; and means for restricting relative separation of said wedge elements lengthwise of the mechanism, thereby restricting relative separation of the followers and holding the mechanism assembled.

In witness that I claim the foregoing I have hereunto subscribed my name this 21st day of February, 1929.

JOHN F. O'CONNOR.